United States Patent
Tanaka

(10) Patent No.: US 9,941,972 B2
(45) Date of Patent: Apr. 10, 2018

(54) OPTICAL TRANSMITTER AND CONTROL METHOD

(71) Applicant: Fujitsu Optical Components Limited, Kawasaki-shi, Kanagawa (JP)

(72) Inventor: Hiromasa Tanaka, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/218,607

(22) Filed: Jul. 25, 2016

(65) Prior Publication Data
US 2017/0034602 A1    Feb. 2, 2017

(30) Foreign Application Priority Data

Jul. 28, 2015  (JP) ................................ 2015-149039

(51) Int. Cl.
| | |
|---|---|
| H04B 10/548 | (2013.01) |
| H04B 10/58 | (2013.01) |
| H04B 10/50 | (2013.01) |
| H04B 10/54 | (2013.01) |
| H04J 14/02 | (2006.01) |

(52) U.S. Cl.
CPC ......... *H04B 10/548* (2013.01); *H04B 10/503* (2013.01); *H04B 10/541* (2013.01); *H04B 10/58* (2013.01); *H04J 14/0221* (2013.01)

(58) Field of Classification Search
None
See application file for complete search history.

(56) References Cited

U.S. PATENT DOCUMENTS

| | | | |
|---|---|---|---|
| 2003/0173571 A1 | 9/2003 | Kish et al. | |
| 2006/0078339 A1* | 4/2006 | Ng ........................ | H04B 10/504 398/195 |
| 2006/0127103 A1* | 6/2006 | Mazurczyk .......... | H04B 10/505 398/188 |
| 2011/0116521 A1* | 5/2011 | Cao ..................... | H01S 5/06804 372/29.021 |

FOREIGN PATENT DOCUMENTS

JP       2009-500833       1/2009

* cited by examiner

*Primary Examiner* — Darren E Wolf
(74) *Attorney, Agent, or Firm* — Staas & Halsey LLP

(57) ABSTRACT

An optical transmitter has an array of laser diodes, which output optical signals from a forward end, and controls the power of the optical signals. The optical transmitter has photodiodes detecting the optical power of optical signals from a reverse end and a LD-DRV unit that supplies to the laser diodes, bias current amplitude modulated to a predetermined frequency that differs from that of the drive signal of the laser diodes. The optical transmitter has a frequency analyzing unit that separates a signal detected by a photodiode, into an optical signal component from a target laser diode and crosstalk optical signal components received from other laser diodes; and a control unit that computes for each detected signal, a ratio of the crosstalk optical signal components to the optical signal component, and performs based on the ratio, a computation to remove the crosstalk optical signal components from the detected signal.

9 Claims, 18 Drawing Sheets

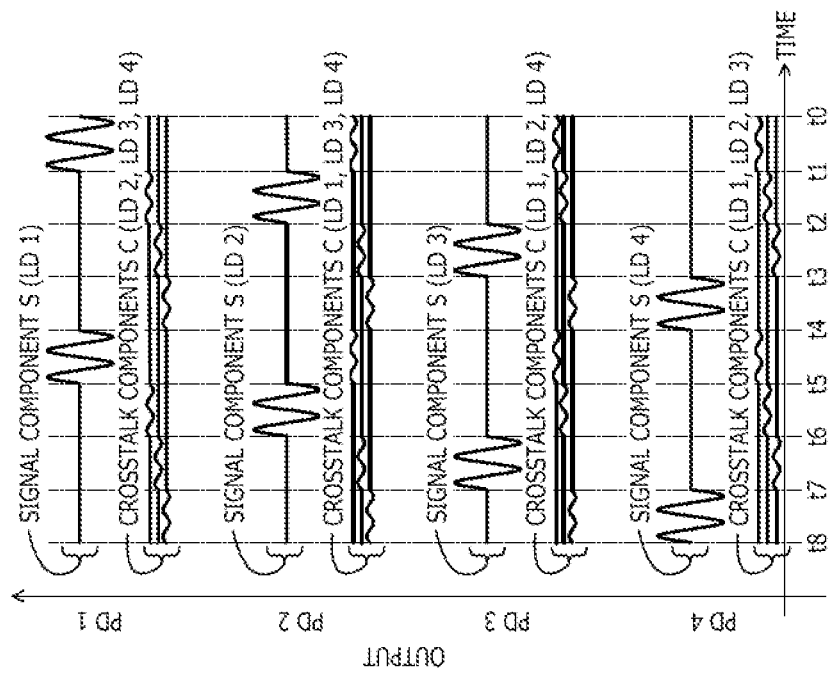
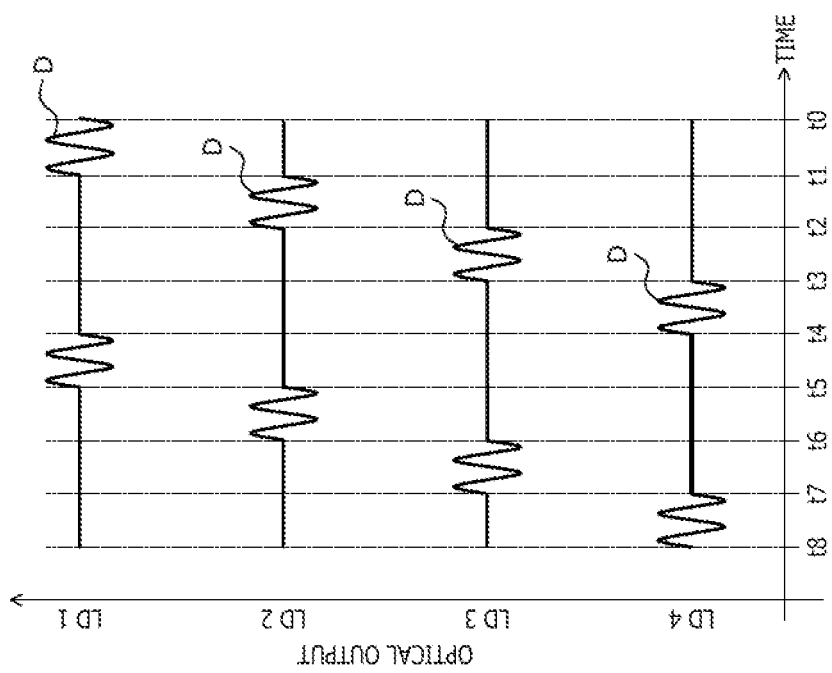

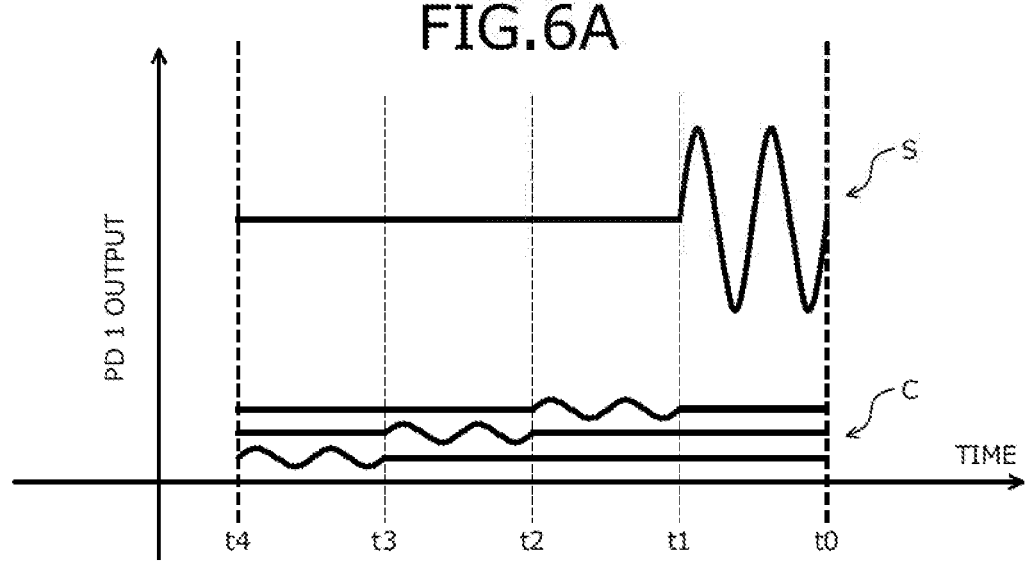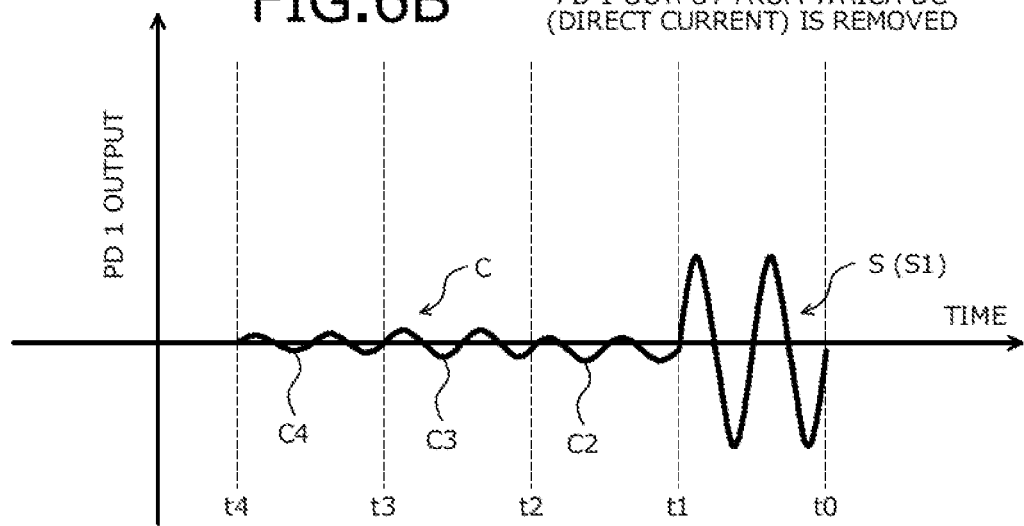

| TIME [s] | LD 1 CURRENT | LD 2 CURRENT | LD 3 CURRENT | LD 4 CURRENT |
|---|---|---|---|---|
| t0 - t1 [s] | Ib1+Id(f) | Ib2 | Ib3 | Ib4 |
| t1 - t2 [s] | Ib1 | Ib2+Id(f) | Ib3 | Ib4 |
| t2 - t3 [s] | Ib1 | Ib2 | Ib3+Id(f) | Ib4 |
| t3 - t4 [s] | Ib1 | Ib2 | Ib3 | Ib4+Id(f) |
| t4 - t5 [s] | Ib1+Id(f) | Ib2 | Ib3 | Ib4 |
| t5 - t6 [s] | Ib1 | Ib2+Id(f) | Ib3 | Ib4 |
| : | : | : | : | : |

FIG.11

| SW OUTPUT OF FREQUENCY ANALYZING UNIT | TIME [s] | MAGNITUDE OF SQUARE ROOT MEAN |
|---|---|---|
| PD 1 OUTPUT | T1(t0 - t4) [s] | PD1 |
| PD 2 OUTPUT | T2(t4 - t8) [s] | PD2 |
| PD 3 OUTPUT | T3(t8 - t12) [s] | PD3 |
| PD 4 OUTPUT | T4(t12 - t16) [s] | PD4 |
| : | : | : |

FIG.13

| SW OUTPUT OF FREQUENCY ANALYZING UNIT | TIME [s] | | MAGNITUDE OF SQUARE ROOT MEAN |
|---|---|---|---|
| PD 1 OUTPUT | T1(t0 - t4) [s] | t0 - t1 | PD1_LD1 |
| | | t1 - t2 | PD1_LD2 |
| | | t2 - t3 | PD1_LD3 |
| | | t3 - t4 | PD1_LD4 |
| PD 2 OUTPUT | T2(t4 - t8) [s] | t4 - t5 | PD2_LD1 |
| | | t5 - t6 | PD2_LD2 |
| | | t6 - t7 | PD2_LD3 |
| | | t7 - t8 | PD2_LD4 |
| PD 3 OUTPUT | T3(t8 - t12) [s] | t8 - t9 | PD3_LD1 |
| | | t9 - t10 | PD3_LD2 |
| | | t10 - t11 | PD3_LD3 |
| | | t11 - t12 | PD3_LD4 |
| PD 4 OUTPUT | T4(t12 - t16) [s] | t12 - t13 | PD4_LD1 |
| | | t13 - t14 | PD4_LD2 |
| | | t14 - t15 | PD4_LD3 |
| | | t15 - t16 | PD4_LD4 |
| ⋮ | ⋮ | ⋮ | ⋮ |

| PD1 x (1-R1) |
| PD2 x (1-R2) |
| PD3 x (1-R3) |
| PD4 x (1-R4) |

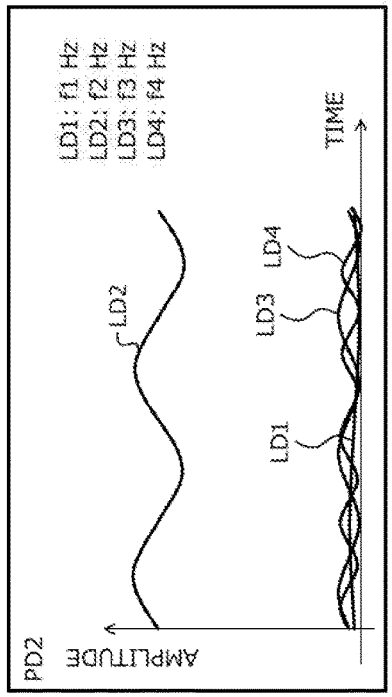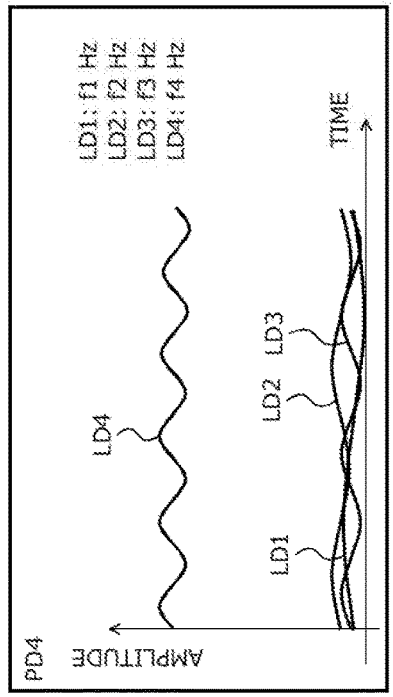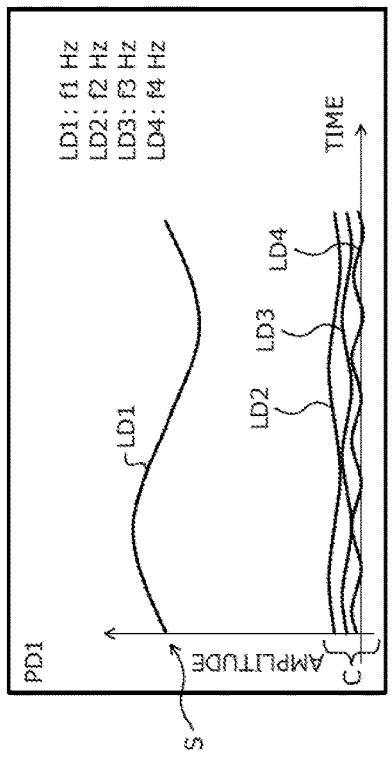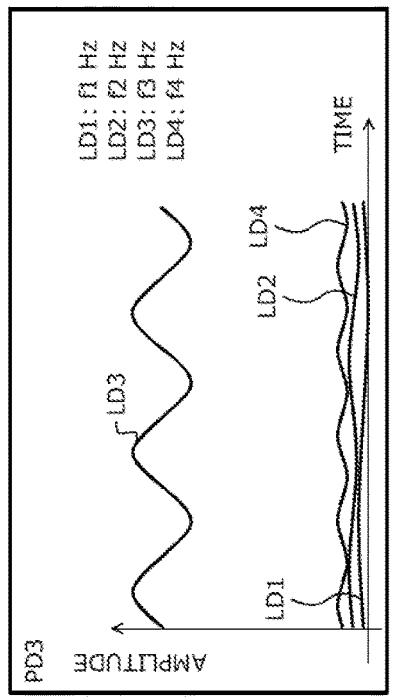

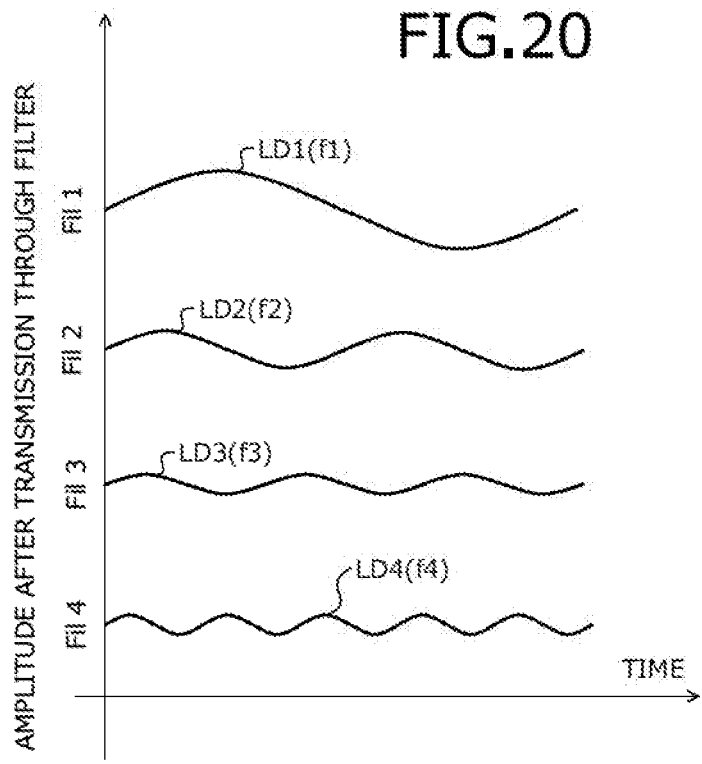
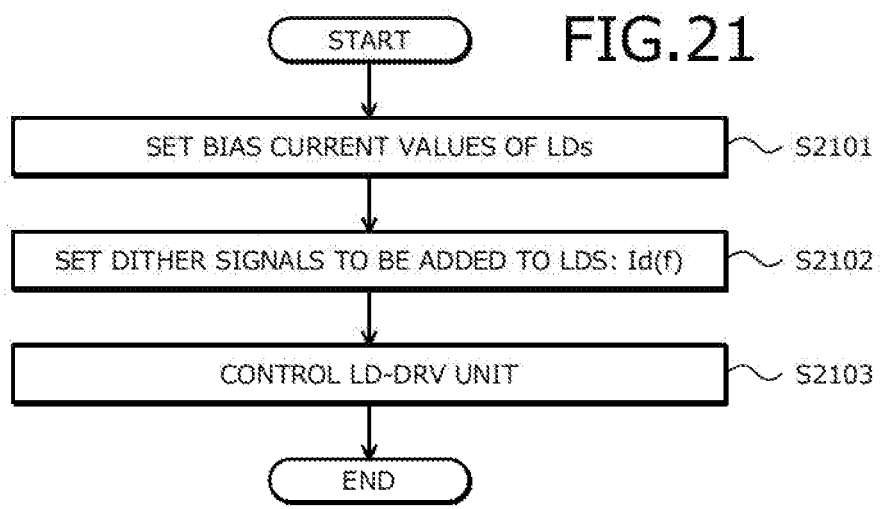

FIG.22

| LD | DITHER FREQUENCY | DITHER AMPLITUDE |
|---|---|---|
| LD1 | f1 [Hz] | Id(f1) |
| LD2 | f2 [Hz] | Id(f2) |
| LD3 | f3 [Hz] | Id(f3) |
| LD4 | f4 [Hz] | Id(f4) |

FIG.23

| LD 1 CURRENT | Ib1+Id(f1) |
|---|---|
| LD 2 CURRENT | Ib2+Id(f2) |
| LD 3 CURRENT | Ib3+Id(f3) |
| LD 4 CURRENT | Ib4+Id(f4) |

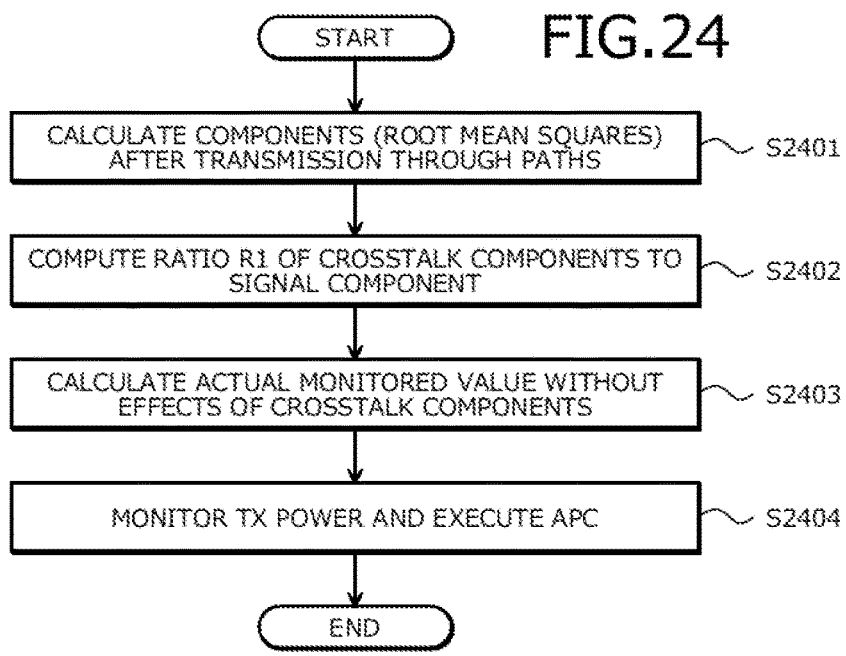

FIG.24

START
↓
CALCULATE COMPONENTS (ROOT MEAN SQUARES) AFTER TRANSMISSION THROUGH PATHS — S2401
↓
COMPUTE RATIO R1 OF CROSSTALK COMPONENTS TO SIGNAL COMPONENT — S2402
↓
CALCULATE ACTUAL MONITORED VALUE WITHOUT EFFECTS OF CROSSTALK COMPONENTS — S2403
↓
MONITOR TX POWER AND EXECUTE APC — S2404
↓
END

FIG.25

| | PATH OF FREQUENCY ANALYZING UNIT | MAGNITUDE OF SQUARE ROOT MEAN |
|---|---|---|
| PD 1 OUTPUT | PATH(1) | PD1 |
| | PATH(2)(Fil1) | PD1_LD1 |
| | PATH(3)(Fil2) | PD1_LD2 |
| | PATH(4)(Fil3) | PD1_LD3 |
| | PATH(5)(Fil4) | PD1_LD4 |

OPTICAL TRANSMITTER AND CONTROL METHOD

CROSS REFERENCE TO RELATED APPLICATIONS

This application is based upon and claims the benefit of priority of the prior Japanese Patent Application No. 2015-149039, filed on Jul. 28, 2015, the entire contents of which are incorporated herein by reference.

FIELD

The embodiments discussed herein are related to an optical transmitter and control method for transmitting optical signals.

BACKGROUND

Optical modules are configured by combinations of optical transmitters that transmit optical signals and/or optical receivers that receive optical signals. An optical transmitter is equipped with a transmitter optical subassembly (TOSA).

The TOSA of a 10-mega optical module such as XFP and SFP+ has one laser diode (LD) that outputs an optical signal from the forward end and one light receiving device (PD) that monitors the optical power of the optical signal output from the reverse end of the LD. Based on the optical signal detected by the PD, a control unit monitors the optical power of the optical signal output by the LD and performs auto power control (APC) with respect to the optical power.

In recent years, the TOSA of a 100-giga optical module such as a CFP and QSFP28, for example, includes in a housing, an array of 4 adjacent LD operating at 25 Gbps and an array of 4 adjacent PDs, respectively corresponding to the LDs. With this structure, a PD 1 receives not only light output from the reverse end of an LD 1 but also a portion of the light output from the reverse ends of other adjacent LDs (LD2, LD3, and LD4), whereby optical crosstalk occurs. Similarly, at PDs 2 to 4, optical crosstalk of light from other LDs occurs.

The amount of crosstalk received by the PDs differs according to the distance to the reverse end of the LD that is the source of the crosstalk and the optical power of the crosstalk source. Further, the temperature environment during operation of the LDs varies. In the optical power monitoring and APC of the LD, the amount of crosstalk becomes errant and as a result, the optical monitoring and APC cannot be performed correctly.

To prevent such effects of crosstalk, for example, various structures are conceivable including a structure that physically blocks the light that comes from other LDs and becomes a crosstalk component, by an opening or partition disposed at the forward end of the PDs; a structure that collects the light via a lens disposed between an LD and a PD; and structure in which a wavelength filter is disposed. A structure that uses arrangement to reduce the effects of crosstalk may be considered such as that in which the LDs are positioned to be away from each other.

A multiplexed-channel transmitter optical integrated circuit has been disclosed that performs low-frequency tone modulation on the LD output of each channel as channel leveling or tagging information, and includes PDs that detect the rear light and LDs, respectively corresponding in number to the number of channels (for example, refer to Published Japanese-Translation of PCT Application, Publication No. 2009-500833).

Nonetheless, in a structure that physically blocks crosstalk light, a member such as a partition or opening has to be disposed and consequently, the size of the TOSA cannot be reduced and manufacturing cost increases. Further, with the technology using low frequency tone modulation, when output equalization of the signal channels is performed, crosstalk components cannot be extracted and the effects of crosstalk between channels on optical power monitoring and APC cannot be resolved.

SUMMARY

According to an aspect of an embodiment, an optical transmitter includes plural laser diodes that output optical signals from a forward end and controls the power of the optical signals. The optical transmitter includes plural light receiving devices configured to detect optical power of optical signals output from a back end of the laser diodes; an LD driving circuit configured to supply to the laser diodes, bias current that has been amplitude modulated to a predetermined frequency that differs from that of a drive signal of the laser diodes; an analyzing circuit configured to separate a signal detected by a light receiving device among the light receiving devices, into a target optical signal component from a target laser diode among the laser diodes, and crosstalk optical signals received from adjacent laser diodes among the laser diodes; and a control circuit configured to compute for the signal detected by each light receiving device among the light receiving devices, a ratio of the crosstalk optical signals to the target optical signal component, and perform based on the ratio, a computation to remove the crosstalk optical components from the detected signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B are timing charts of an LD crosstalk state of the optical transmitter according to the first embodiment;

FIGS. 6A and 6B are diagrams of an output signal of the frequency analyzing unit according to the first embodiment;

FIG. 11 is chart of calculated root mean squares;

FIG. 13 is a chart of the root mean square calculated for signals output from a path (2);

FIG. 15 is a chart of equations for calculating a ratio R of crosstalk components C to a signal component S;

FIG. 16 is a chart of equations for calculating the signal component S;

FIGS. 17A, 17B, 17C, and 17D are diagrams of examples of waveforms of light received by PDs of the optical transmitter according to a second embodiment;

FIG. 20 is a diagram of detected signals transmitted by a filter of the frequency analyzing unit according to the second embodiment;

FIG. 21 is a flowchart of an example of the setting process by the optical transmitter according to the second embodiment;

FIG. 22 is a chart depicting a setting example of the dither signal for each LD of the optical transmitter according to the second embodiment;

FIG. 23 is a chart depicting an example of LD current values based on the setting process of the optical transmitter according to the second embodiment;

FIG. 24 is a flowchart of an example of a process of removing crosstalk components of the optical transmitter according to the second embodiment; and FIG. 25 is a diagram of an example of information during the process of removing crosstalk components by the optical transmitter according to the second embodiment.

DESCRIPTION OF THE INVENTION

Figure 1:
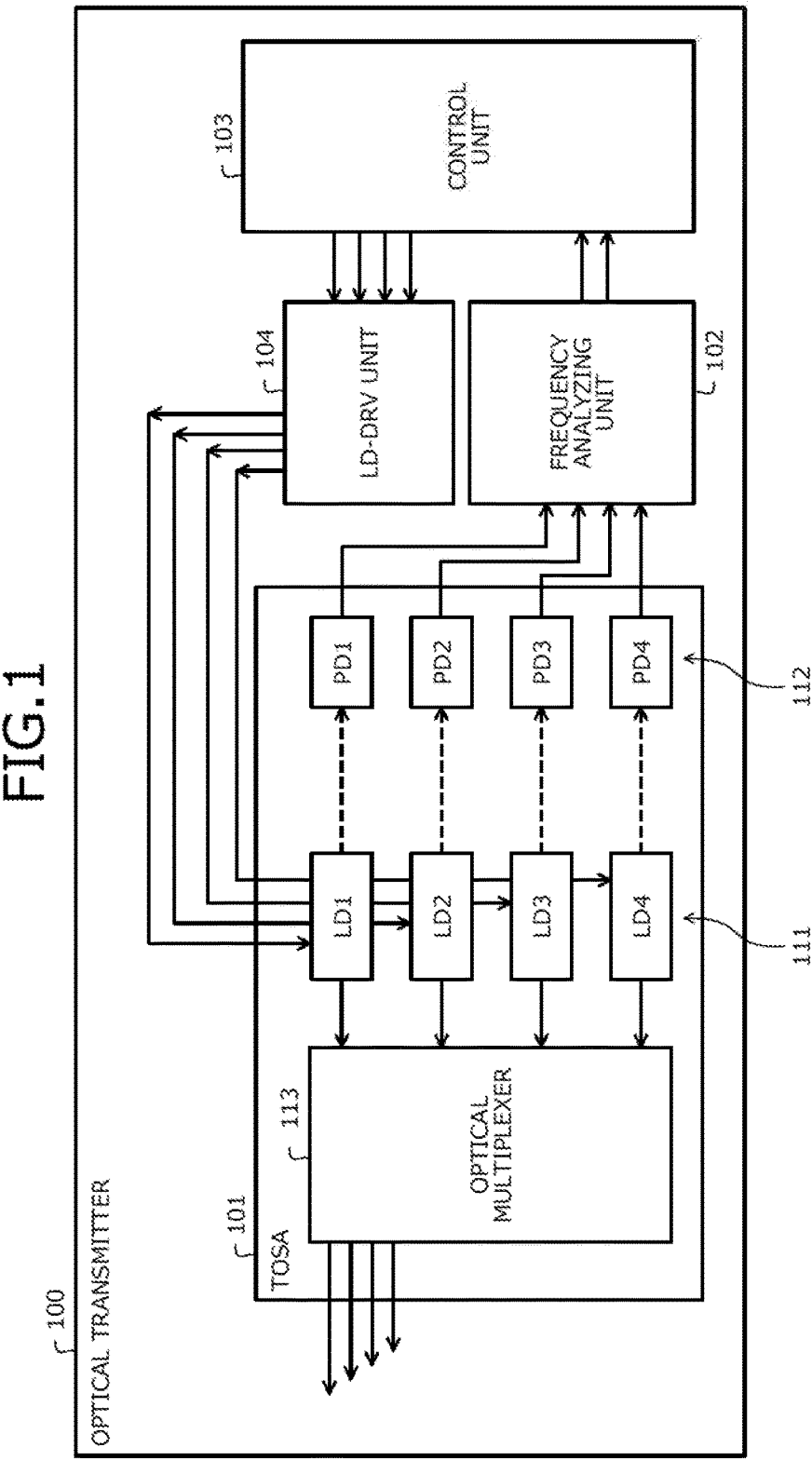
FIG. 1 is a block diagram of an optical transmitter according to a first embodiment.

FIG. 1 is a block diagram of an optical transmitter according to the first embodiment. An optical transmitter 100, for example, is an optical transmitter of a 100-giga optical module. The optical module may further include an optical receiver (not depicted). The optical transmitter 100 includes a TOSA 101, a frequency analyzing unit (analyzing unit) 102, a control unit 103, and a LD driving unit (LD-DRV unit) 104.

The TOSA 101 includes multiple systems (channels) of semiconductor lasers (LD) 111, light receiving devices (PD) 112 corresponding to the LDs 111, and an optical multiplexer 113. In the example depicted in FIG. 1, a 4-channel array of LDs 1 to 4 (111) and corresponding PDs 1 to 4 (112) are arranged.

The LD-DRV unit 104 supplies to the LDs 1 to 4 (111), current (bias current) required to drive the LDs 1 to 4 (111), and modulated waves of an input transmission signal. The LD-DRV unit 104 supplies to the LDs 1 to 4 (111) by a predetermined frequency f[Hz] that differs from the frequency of the drive signal of the LDs 111, a dither signal that is bias current that has been amplitude modulated by, for example, a sine wave.

The frequency f of the dither signal is lower than the frequency of the drive signal and is used for extracting a crosstalk component from the LDs of other channels. In the first embodiment, the dither signal is repeatedly output to the LDs 1 to 4 (111) by time division.

The LDs 1 to 4 (111) output optical signals from the forward end. The optical signals are multiplexed by the optical multiplexer 113 and output from the optical transmitter 100 to an external optical transmission path such as an optical fiber. When the LDs 1 to 4 (111) each output an optical signal having a transmission speed of 25 Gbps, the optical multiplexer 113 outputs optical signal of a transmission speed of 25×4=100 Gbps to the optical transmission path.

The power of the optical signals output from the reverse end of the LDs 1 to 4 (111) is detected by PDs 1 to 4 (112) and the detected signals are output to the frequency analyzing unit 102. The frequency analyzing unit 102 separates the detected signal into an optical signal component received from the target LD 111 (for example, LD 1) for which detection is to be performed and crosstalk optical signal components received from other LDs 111 (for example, LDs 2 to 4).

The control unit 103 controls the driving of the LD-DRV unit 104 by bias current that includes a dither signal. Based on the output (information) of the frequency analyzing unit 102, the control unit 103 obtains the crosstalk components (ratio of crosstalk optical signal components to the target optical signal component) and performs calculations to obtain the value of the detected signal (actual monitored value) without the effects of the crosstalk components.

Based on the actual monitored value, the control unit 103 controls the LD-DRV unit 104 and monitors the optical power of the LDs 1 to 4 (111). The control unit 103 further executes the APC to make the optical power output by the LDs 1 to 4 (111) (for example, adjacent wavelength level) constant. The APC is performed by varying the bias current (DC component) output by the LD-DRV unit 104.

FIGS. 2A and 2B are timing charts of the LD crosstalk state of the optical transmitter according to the first embodiment. FIG. 2A depicts optical output-time characteristics of the LDs 1 to 4 (111) when a dither signal is added. FIG. 2B depicts optical output-time characteristics of the signal component and crosstalk components detected by the PDs 1 to 4 (112).

The LD-DRV unit 104 supplies a dither signal D of the frequency f [Hz] for each elapse of a period (time division), to one of the LDs 1 to 4 (111). In the example depicted in FIG. 2A, the dither signal is supplied to only the LD 1 from the time t0 to t1; is supplied to only the LD 2 from the time t1 to t2; is supplied only to the LD 3 from the time t2 to t3; and is supplied only to the LD 4 from the time t3 to t4. Thereafter, from the time t4 to t5, the dither signal is supplied to only the LD 1 and is repeatedly supplied to the LDs 1 to 4, sequentially, by time division.

As depicted in FIG. 2B, the PDs 1 to 4 (112) detect inclusion of a predetermined amount of crosstalk components c, in addition to the signal component s that is output by the LDs 1 to 4 (111) and corresponds to the dither signal.

For example, concerning the detection by the PD 1 (112), the signal component S detected from the time t0 to t1 is the back power of only the LD 1 (111) from which the PD 1 (112) is supposed to receive light. For example, from the time t1 to t2, the PD 1 (112) receives an AC crosstalk component from the LD 2 and a DC crosstalk component from the LD 3 and the LD 4, as crosstalk components.

Figure 3:
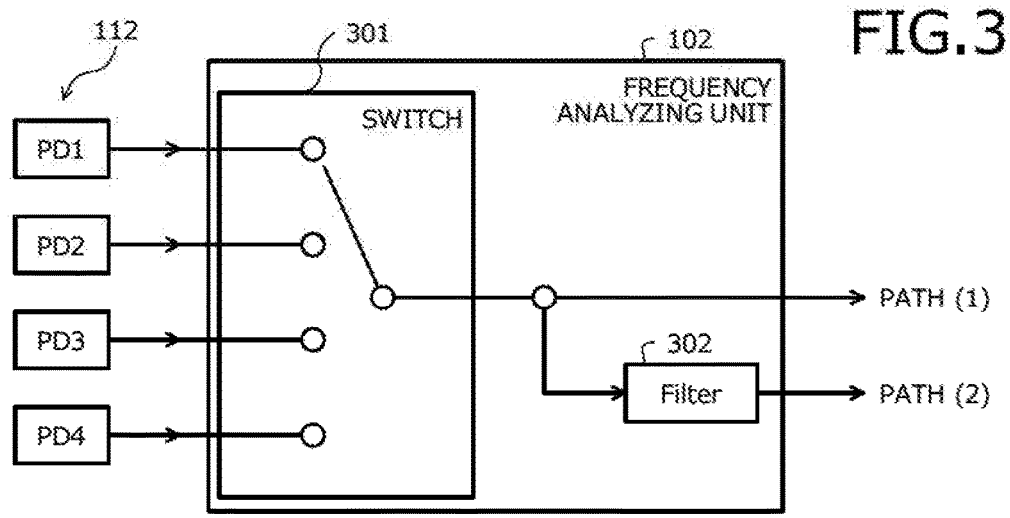
FIG. 3 is a diagram of an example of internal configuration of a frequency analyzing unit of the optical transmitter according to the first embodiment.

FIG. 3 is a diagram of an example of internal configuration of the frequency analyzing unit of the optical transmitter according to the first embodiment. As depicted in FIG. 3, the frequency analyzing unit 102 has a switch 301 disposed upstream. The switch 301 cyclically switches the path of the signals output from the PDs 1 to 4 (112). The frequency analyzing unit 102 branches output signals that have passed the switch 301, to a path (1) that does not pass an electronic filter 302 and a path (2) that passes the filter 302.

The filter 302 is a filter that filters out the DC component to extract the AC component from the output signal and, for example, may use a bandpass filter, coupling capacitor, or the like.

Figure 4:
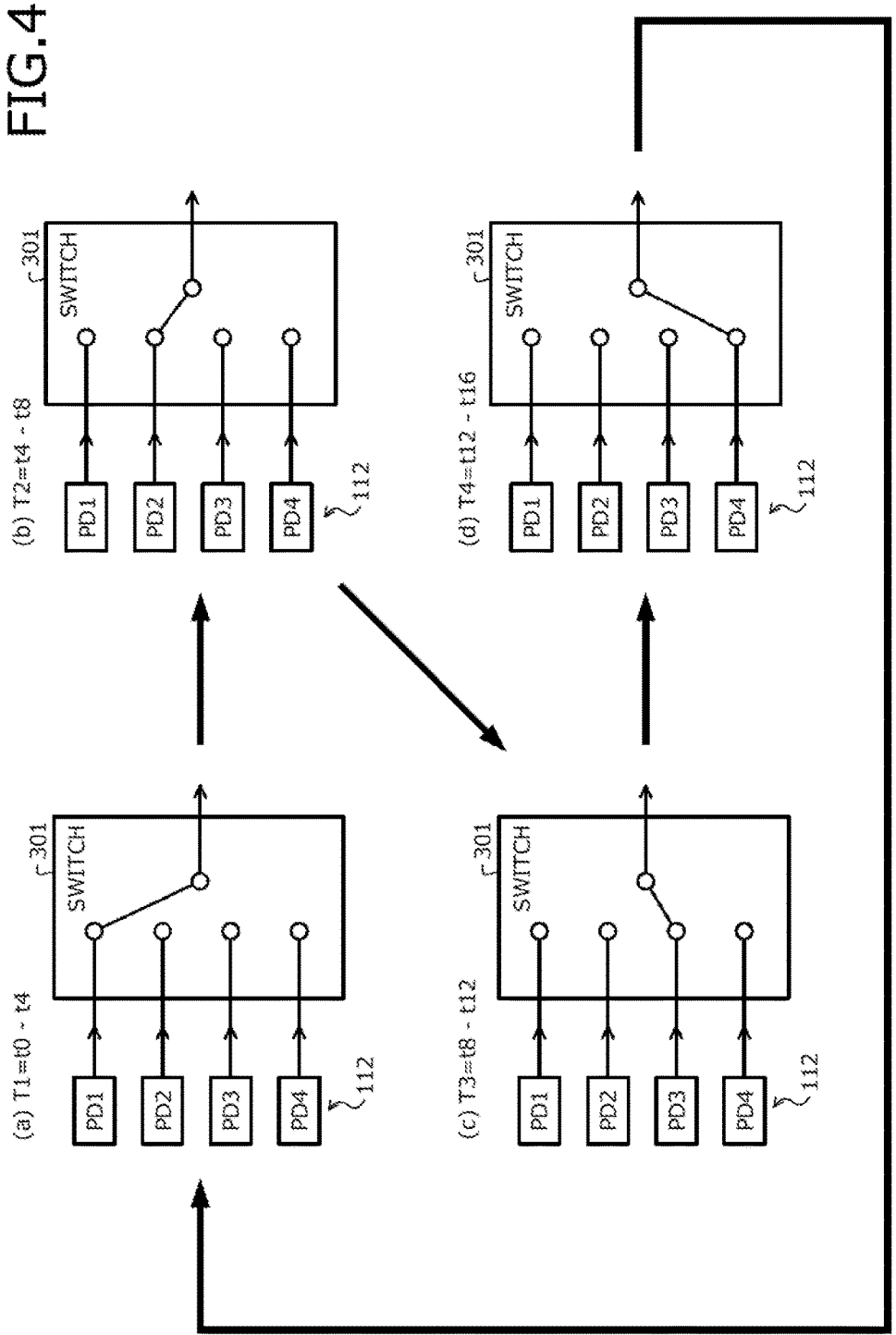
FIG. 4 is a diagram of switching operation inside the frequency analyzing unit according to the first embodiment.

FIG. 4 is a diagram of switching operation inside the frequency analyzing unit of the optical transmitter according to the first embodiment. The timing of switching by the switch 301 of the frequency analyzing unit 102 depicted in FIG. 3 will be described.

The switch 301 switches the path on the input side from the PDs 1 to 4 (112) for each cycle T1 to T4, in the sequence of (a)→(b)→(c)→(d)→(a)→ . . . , for output and at T5, assumes the same arrangement as at T1. The switch 301 is controlled by the control unit 103. The control unit 103 uses an internally generated clock signal for timing the switching and controls the switching of the switch 301 to be synchronous with the output timing of the dither signal.

Therefore, at the cycles T1, T5, T9, . . . at (a), the output signal of the PD 1 (112) is selectively taken out; and at the cycles T2, T6, T10, . . . at (b), the output signal of the PD 2 (112) is selectively taken out. Similarly, at the cycles at (c) and (d), the output signals of the PD 3 and the PD 4 (112) are selectively taken out, respectively.

Figure 5:
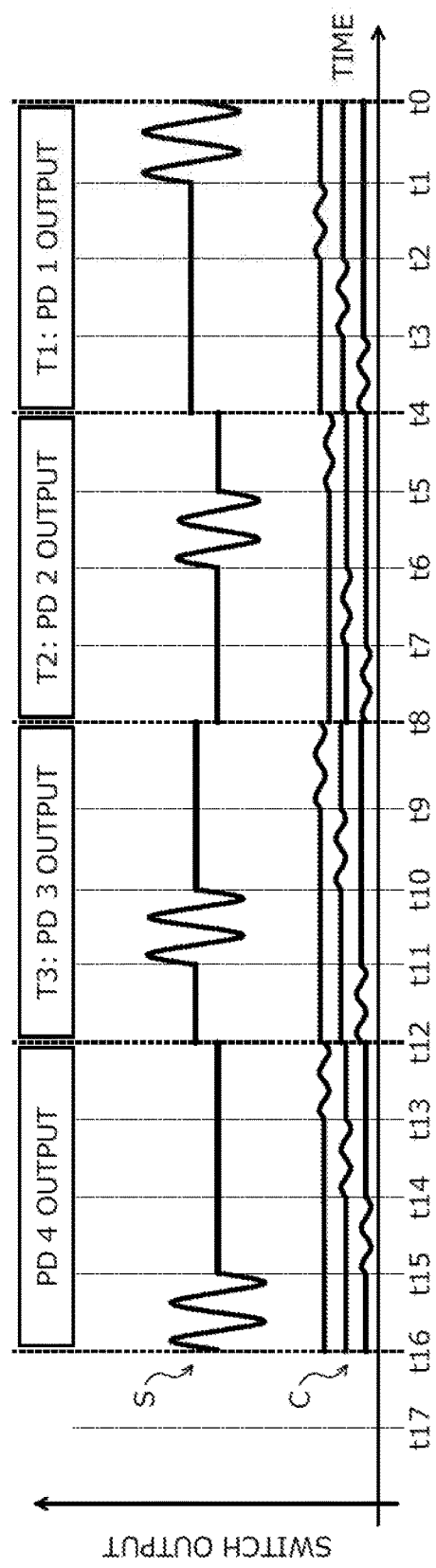
FIG. 5 is a timing flowchart of switch output inside the frequency analyzing unit according to the first embodiment.

FIG. 5 is a timing flowchart of switch output inside the frequency analyzing unit of the optical transmitter according to the first embodiment. At each cycle, the switch 301 switches and outputs the output signals of the PDs 1 to 4 (112).

At the first cycle (T1=t0 to t4), the output signal of the PD 1 (112) is output, and at the subsequent cycle (T2=t4 to t8), the output signal of the PD 2 (112) is output. At the subsequent cycle (T3=t8 to t12), the output signal of the PD 3 (112) is output, and at the subsequent cycle (T4=t12 to t16), the output signal of the PD 4 (112) is output. From the time t16, output returns to that of the PD 1 (112).

As depicted in FIG. 5, the output of the switch 301 includes the signal component S and crosstalk components C.

For the sake of simplicity, hereinafter, description will be given for the output signal of the PD 1 (112) at a given single cycle T1 (time t0 to t4).

FIGS. 6A and 6B are diagrams of an output signal of the frequency analysing unit of the optical transmitter according to the first embodiment. FIG. 6A depicts the output signal of the path (1) of the frequency analyzing unit 102. During the interval of the cycle T1 (time t0 to t4), the path (1) of the frequency analyzing unit 102 outputs the output signal of the PD 1 (112) selected by the switch 301 and, similar to FIG. 5, the output signal includes the signal component S and the crosstalk components C.

FIG. 6B depicts the output signal of the path (2) of the frequency analyzing unit 102. During the interval of the cycle T1 (time t0 to t4), in the path (2) of the frequency analyzing unit 102, the output signal of the PD 1 (112) selected by the switch 301 passes through the filter 302.

The filter 302 extracts the AC component of the frequency f (Hz) and transmits the output signal through a bandpass filter that removes the DC component. The DC bias component that includes the dither signal is removed, the AC signal component S and the crosstalk components C are passed. As a result, as depicted in FIG. 6B, after transmission through the filter 302, an output signal including only the AC component (the signal component S) of the PD 1 (112) is output from the path (2).

During the cycle T1 (from time t0 to t1), the path (2) outputs the signal component S1 of the PD 1 (112), from which the crosstalk components C have been removed. As the output signal of the PD 1 (112) thereafter, the crosstalk component C2 (AC component) of the LD 2 (111) is output from the time t1 to t2. Similarly, the crosstalk component C3 from the LD 3 (111) is output from the time t2 to t3, and the crosstalk component C4 from the LD 4 (111) is output from the time t3 to t4.

The output signal depicted in FIG. 6A and transmitted through the path (1), and the output signal depicted in FIG. 6B and transmitted through the path (2) are input to the control unit 103.

Figure 7:
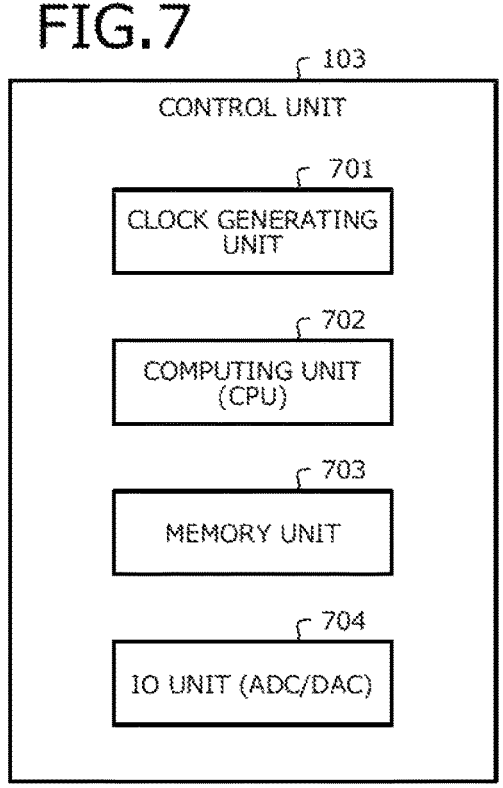
FIG. 7 is a diagram of an example of an internal structure of a computing unit of the optical transmitter according to the first embodiment.

FIG. 7 is a diagram of an example of an internal structure of a computing unit of the optical transmitter according to the first embodiment. The control unit 103 includes a clock generating unit 701, a computing unit 702, a memory unit 703, and an interface (IO) unit 704, respectively connected by a bus.

The clock generating unit 701 generates a clock of a predetermined frequency and supplies to the clock for timing operations of the units of the computing unit 702. The switch 301 performs the switching operations at the timing described, based on the clock generated by the clock generating unit 701.

The computing unit 702, for example, is implemented using a CPU and performs computations to obtain the signal component S from which the crosstalk components C have been removed. The computing unit 702 uses the obtained signal component S to monitor the optical power of the LDs 1 to 4 and to perform APC of the LDs 111 via the LD-DRV unit 104.

The memory unit 703, for example, includes read-only memory (ROM), random access memory (RAM), and flash ROM.

For example, the flash ROM and the ROM store various types of programs, and the RAM is used as a work area of the CPU 702. A program stored by the ROM is loaded onto the CPU 702, whereby a coded process is executed by the CPU 702.

The IO unit 704 controls the input and output of various types of signals for the control unit 103. For example, the IO unit 704 includes an ADC that AD converts an input signal from the frequency analyzing unit 102 and a DAC that DA converts an output signal to the LD-DRV unit 104.

The filter 302 of the frequency analyzing unit 102 may be an analog filter or a digital filter. In the case of a digital filter, the filter 302 may be one function of the control unit 103 (e.g., CPU).

An operation example of removing the crosstalk components C from the signal component S by the configuration of the first embodiment will be described. A setting process and a process of removing the crosstalk components by the control unit 103 will be described.

Figure 8:
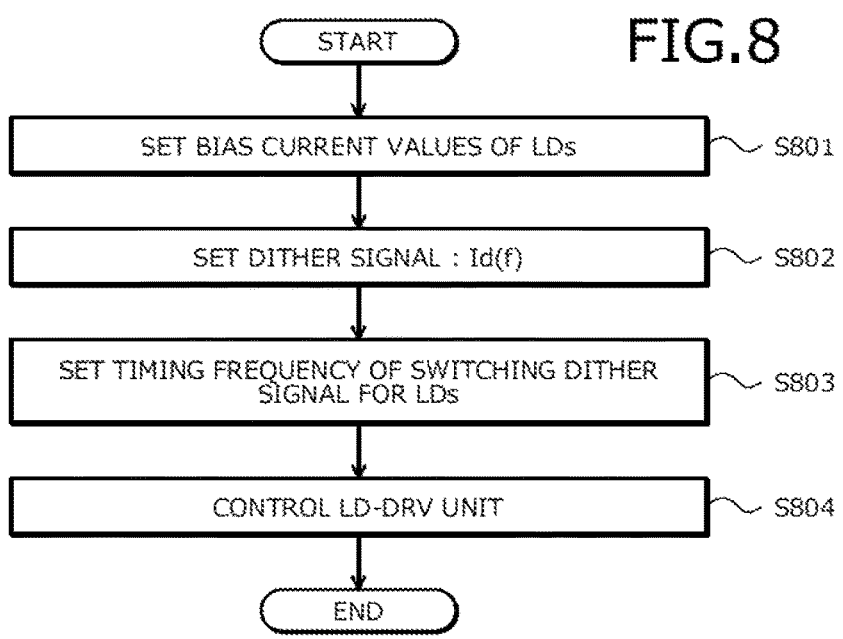
FIG. 8 is a flowchart of an example of a setting process by the optical transmitter according to the first embodiment.

FIG. 8 is a flowchart of an example of the setting process by the optical transmitter according to the first embodiment. The control unit 103 sets the initial operation value of the LD-DRV unit 104.

The control unit 103 sets respective bias current values Ib1 to Ib4 of the LDs 1 to 4 (111) (step S801). The control unit 103 sets a dither signal Id (f) (step S802). "f" is dither frequency [Hz], and "Id" is dither amplitude [mA].

The control unit 103 sets the timing frequency of switching the dither signal Id for the LDs 1 to 4 (111) (step S803). For example, when the timing frequency is Ft[Hz], one cycle T[s] is T=1/Ft.

The control unit 103 controls the LD-DRV unit 104 based on the settings made at steps S801 to S803 (step S804).

Figures 9, 10:
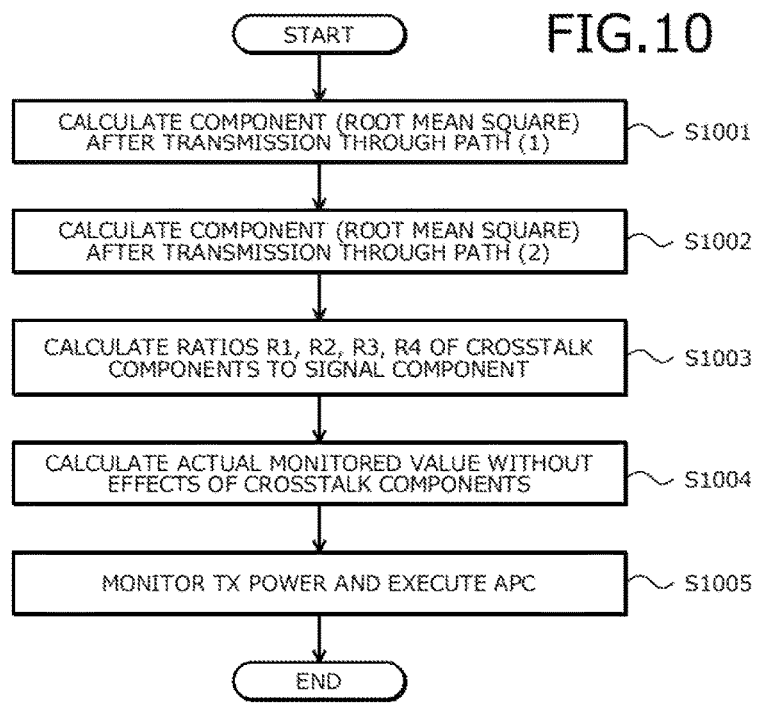
FIG. 9 is a chart depicting an example of LD current values according to time.
FIG. 10 is a flowchart of example of a process of removing crosstalk components by the optical transmitter according to the first embodiment.

FIG. 9 is a chart depicting an example of LD current values according to time and based on the setting process of the optical transmitter according to the first embodiment. The chart depicts an example of current values for the LDs 1 to 4 (111) according to time, when the control unit 103 controls the LD-DRV unit 104 at step S804 in FIG. 8.

For example, from the time t0 to t1, the dither signal is supplied to only the LD 1, and the current of the LD 1 is Ib1+Id(f). Here, the current values of the other LDs 2 to 4 are Ib2, Ib3, and Ib4, respectively (refer to FIGS. 2B and 5). Thereafter, from the time t4 to t5, again the dither signal is supplied to only the LD 1 and the current supplied to the LD 1 is Ib1+Id(f).

From the time t1 to t2, the dither signal is supplied to only the LD 2 and the current of the LD 2 is Ib2+Id(f). Here, the current values of the other LDs1, LD 3, and LD 4 are Ib1, Ib3, and Ib4, respectively (refer to FIG. 2B).

The control unit 103 drives the LDs 1 to 4 (111) via the LD-DRV unit 104, at each time t0 to tn, based on the settings according to FIG. 9. Here, the bias points of the LDs 1 to 4 (111) waver by the frequency f (refer to FIGS. 2A and 2B).

FIG. 10 is a flowchart of example of a process of removing crosstalk components by the optical transmitter according to the first embodiment. The control unit 103 executes the operations depicted in FIG. 10 after executing the setting process depicted in FIG. 8.

The control unit 103 calculates the root mean square for the output signal of each of the PDs 1 to 4 (112), transmitted through the path (1) (step S1001). The control unit 103 calculates the root mean square for the output signal of each of the PDs 1 to 4 (112), transmitted through the path (2) (step S1002).

The control unit 103, for each of the PDs 1 to 4 (112), uses the calculated values obtained at step S1002 and calculates a ratio R of the crosstalk components C with respect to the signal component s (step S1003). The control unit 103 uses the calculated values obtained at step S1001 and the calculated values obtained at step S1003 to calculate the signal component S (actual monitored value) without the effects of the crosstalk components C (step S1004).

The control unit 103 uses the signal component S (actual monitored value) obtained at step S1004, and monitors the transmission (TX) power of the LDs 1 to 4 (111) and executes APC (step S1005).

FIGS. 11, 12, 13, 14, 15, and 16 are diagrams of examples of information during the process of removing crosstalk components by the optical transmitter according to the first embodiment. The information corresponds to the contents of the memory unit 703, which stores values calculated (computed) by the control unit 103.

FIG. 11 depicts the root mean squares calculated at step S1001 in FIG. 10, for the output signals of the PDs 1 to 4 (112), transmitted through the path (1). The root mean square PD1 during the cycle T1 (time t0 to t4) is stored in the memory unit 703 as the output of the PD 1 (112). The root mean square of the PD 2 during the cycle T2 (time t4 to t8) is stored in the memory unit 703 as the output of the PD 2 (112). Similarly, the root mean squares PD3 and PD4 of the corresponding cycles are stored to the memory unit 703 as the output of the PDs 3 and 4.

Figure 12:
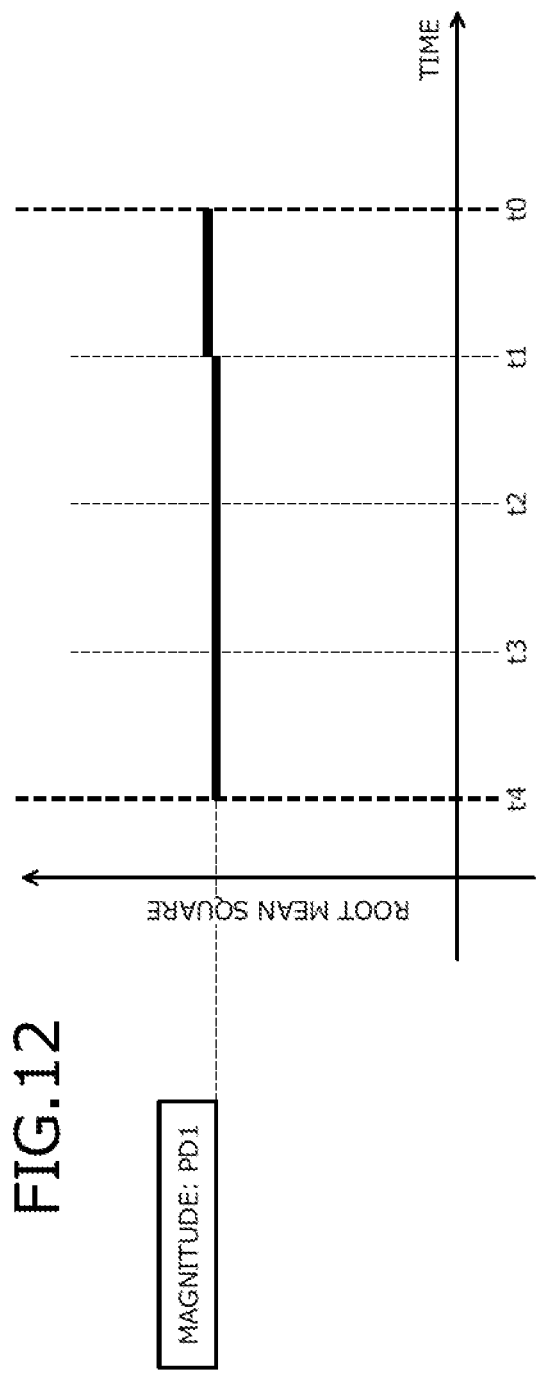
FIG. 12 is a diagram of an example of thy root mean square of output signals from a path (1)

FIG. 12 is a diagram of an example of the root mean square of output signals from the path (1) and described with reference to FIG. 11. FIG. 12 depicts the magnitude of the output signal of the PD 1, detected from time t0 to t4.

FIG. 13 is a chart of the root mean square calculated at step S1002 in FIG. 10 for the signals output from the path (2) by the PDs 1 to 4 (112). As the PD 1 (112) output, the root mean square PD1 is stored in the memory unit 703 according to time t0 to t4, for the cycle T1. The root mean square PD1 between the time t0 to t1 is stored as PD1_LD1; the root mean square PD1 between the time t1 to t2 is stored as PD1_LD2; the root mean square PD1 between the time t2 to t3 is stored as PD1_LD3; and the root mean square PD1 between the time t3 to t4 is stored as PD1_LD4.

For example, between the time t0 to t1, the root mean square PD1 is indicated as PD1_LD1 since the dither signal is added to the LD 1 (111); between the time t1 to t2, the root mean square PD1 is indicated as PD1_LD2 since the dither signal is added to the LD 2 (111).

Figure 14:
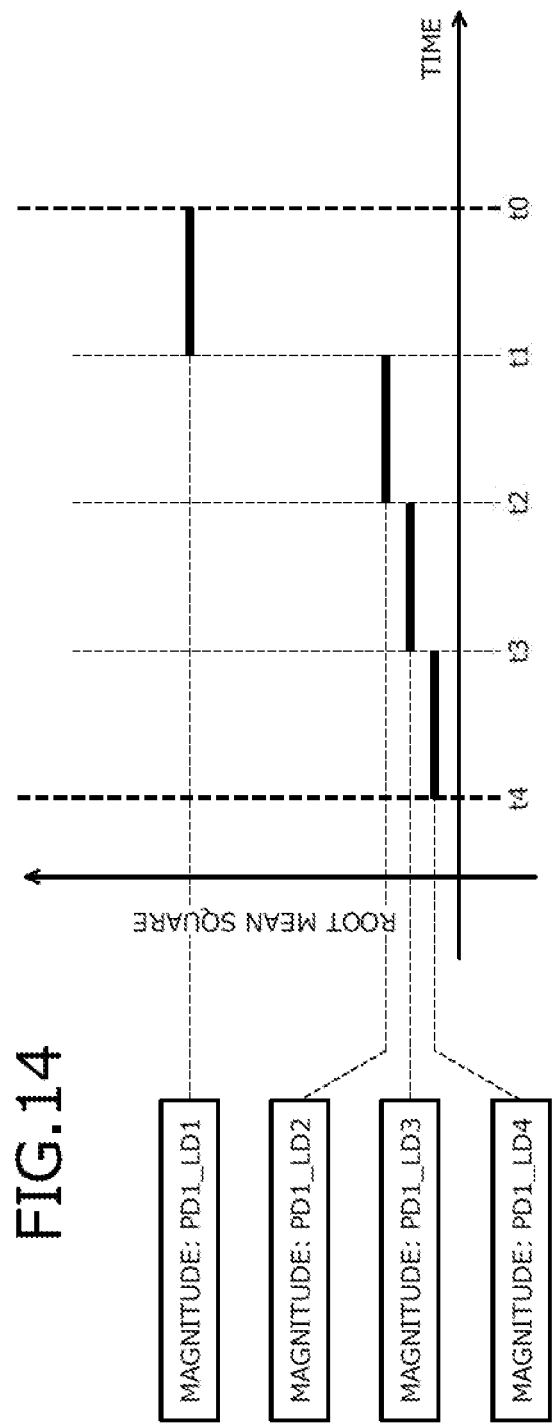
FIG. 14 is a diagram of an example of the root mean square of the output signals described with reference to FIG. 13.

FIG. 14 is a diagram of an example of the root mean square of the output signals from the path (2), described with reference to FIG. 13. FIG. 14 depicts the magnitude of the output signals PD1_LD1 to PD1_LD4 detected between the time t0 to t4.

FIG. 15 is a chart of equations for calculating the ratio R of the crosstalk components C to the signal component S, at step S1003 in FIG. 10. "R1" is the ratio of the crosstalk components C to the signal component S, detected by the PD 1 (112). "R1" is obtained, for example, by the equation R1={PD1_LD2+PD1_LD3+PD1_LD4}/PD1_LD1, using the root mean square of the output signals of the PDs 2 to 4 (112) calculated at step S1002 and the root mean square of the output signal of the PD 1 (112).

"R2" is the ratio of the crosstalk components C to the signal component S detected by the PD 2 (112). "R2" is obtained, for example, by the equation R2={PD2_LD2+PD2_LD3+PD2_LD4}/PD2_LD1, using the root mean square of the output signals of the PDs 1, 3, and 4 (112) calculated at step S1002 and the root mean square of the output signal of the PD 2 (112). "R3" and "R4" are the ratios of the crosstalk components C to the signal component S detected by the PDs 3 and 4 (112), respectively.

FIG. 16 is a chart of equations for calculating the signal component S (actual monitored value) without the crosstalk components C, at step S1004 in FIG. 10. The product PD1×R1 of PD1 and R1 represents the crosstalk components C in the output signal of the PD 1 (112). Thus, PD1×(1−R1) is the back power monitored value of the LD 1 (111) without the crosstalk components C.

The control unit 103 uses the value of PD1×(1−R1) when performing optical output (TX) power monitoring for the LD 1 (111) by using the PD 1 (112) or when performing APC of the LD 1 (111). As a result, the control unit 103 is able to perform APC and optical output power monitoring corresponding to a state not affected by crosstalk.

As depicted in FIG. 16, for the LD 2, the control unit 103 performs the calculation PD2×(1−R2) and further performs the calculations depicted in FIG. 16, for the LDs 3 and 4. Thus, for each of the LDs 1 to 4, the control unit 103 is able to perform the APC and optical output power monitoring corresponding to a state not affected by crosstalk.

As described, according to the first embodiment, a dither signal whose frequency differs from the frequency of the drive signal of the LDs is output to each LD. The LD output, is detected by the PDs, and crosstalk components are removed from the signal component. Removal of the crosstalk components enables the APC to be performed as well as optical output monitoring that is not affected by crosstalk.

In the first embodiment, the PD output is branched and a filter is disposed on one of the paths, the AC component is extracted and the DC component is removed, and crosstalk components are extracted. The output signals of each path are used to obtain the ratio of crosstalk components, whereby the crosstalk components are removed from the signal component. Here, the root mean square of the output signals of the paths is calculated, whereby the extraction of the temporally varying crosstalk components of detected signals is facilitated.

Further, in the first embodiment, a dither signal of a single frequency f is output to the LDs by time division and by a switching operation of a switch synchronous with the LD output, a process of computing the crosstalk components by time division is performed. As a result, at the LD-DRV unit, which generates a modulation signal according to the frequency of the dither signal, a single oscillation frequency (a single oscillator) may be used and in the frequency analyzing unit, a single filter may be disposed. The number of ADCs disposed in the computing unit may correspond to the number of PDs, enabling the number to be minimized and affording a simpler hardware configuration.

The optical transmitter 100 of a second embodiment has a similar overall configuration as the first embodiment (FIG. 1); however a dither signal whose frequency varies according to the LDs 1 to 4 (111) is used and the internal configuration of the frequency analyzing unit 102 and the details of the computation process of the control unit 103 differ from the first embodiment.

FIGS. 17A, 17B, 17C, and 17D are diagrams of examples of waveforms of the light received by the PDs of the optical transmitter according to the second embodiment. FIG. 17A depicts the monitor signal (detected signal) detected by the PD 1 for the corresponding LD thereof; similarly, FIG. 17B depicts the same for the PD 2; FIG. 17C depicts the same for the PD 3; and FIG. 17D depicts the same for the PD 4.

With respect to the LDs 1 to 4 (111), the control unit 103 performs amplitude modulation by a signal frequency (dither signal) that differs from the frequency of the drive signals of the LDs 111. For example, the control unit 103 controls the LD-DRV unit 104 so that the bias current of the LD 1 can be modulated by frequency f1[Hz]. In this case, the optical output power of the LD 1 is varied by frequency f1[Hz] and the signal detected by the PD 1 (112), which detects the optical power output from the reverse end of the LD 1, also varies by frequency f1[Hz].

Similarly, the LDs 2, 3, and 4 (111) are subject to amplitude modulation by dither signals of frequency f2[Hz], frequency f3[Hz], and frequency f4[Hz], respectively, whereby the signals detected by the PDs 2, 3, and 4, which respectively detect the optical power output from the reverse ends of the LDs, vary by frequency f2, frequency f3, and frequency f4[Hz].

Here, the PD 1 in FIG. 17A will be described as an example. The PD 1 (112) receives the signal component S of the reverse end of the LD 1 (111) and the crosstalk components C from the other LDs 2 to 4 (111). The crosstalk components C have a lower level than the signal component S and therefore, the signal component S of frequency f1 is the highest and the crosstalk components C of frequency f2, frequency f3, and frequency f4 have low levels.

Similarly, the monitored signals received at the PDs 2 to 4 (112), as depicted in FIGS. 17B to 17D, include the signal component s and the crosstalk components c.

The signals detected by the PDs 1 to 4 (112) are input to the frequency analyzing unit 102 downstream. Here, description will be given with respect to the PD 1 (112).

Figure 18:
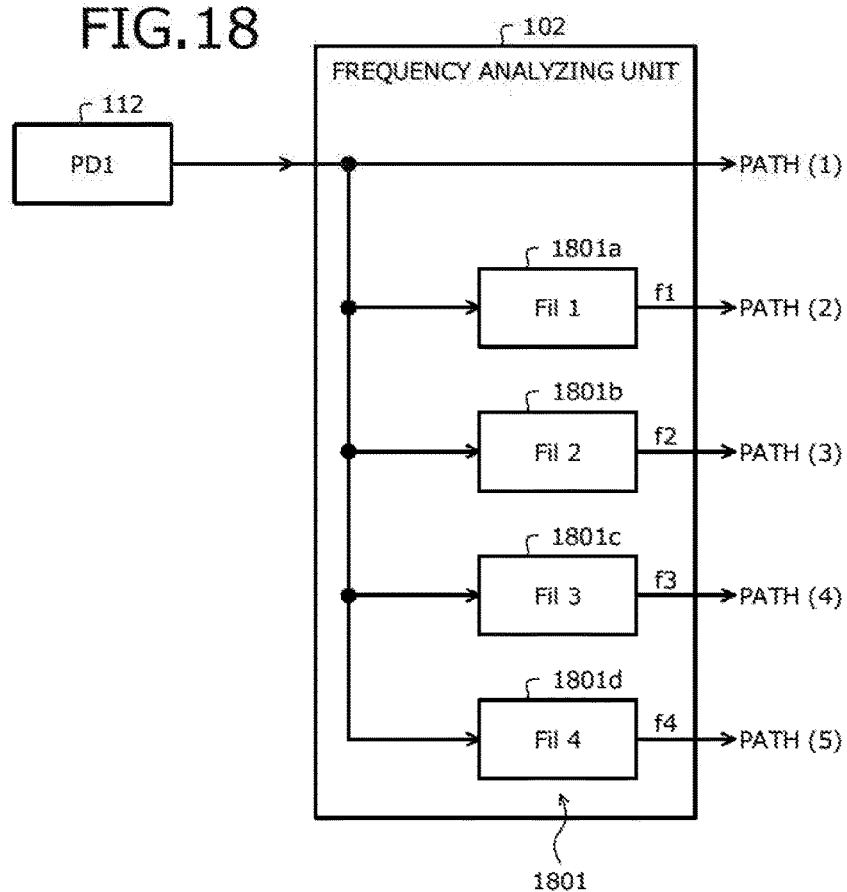
FIG. 18 is a diagram of an example of the internal configuration of the frequency analyzing unit of the optical transmitter according to the second embodiment.

FIG. 18 is a diagram of an example of the internal configuration of the frequency analyzing unit of the optical transmitter according to the second embodiment. The frequency analyzing unit 102 replicates the output signal from the PD 1 (112), and branches the output signal to paths that pass an electronic filter 1801 (paths 2 to 5) and a path (path 1) that does not pass the filter 1801. The filter 1801 includes 4 filters Fil1 (1801a) to Fil4 (1801d) corresponding to the frequencies f1 to f4 of the dither signal. The PDs 2 to 4 (112) have the same configuration depicted in FIG. 18 and respectively have the filter 1801 (1801a to 1801d).

The filter 1801 may be an analog filter or a digital filter. In the case of a digital filter, the filter 1801 may be one function of the control unit 103 (e.g., CPU).

Figure 19:
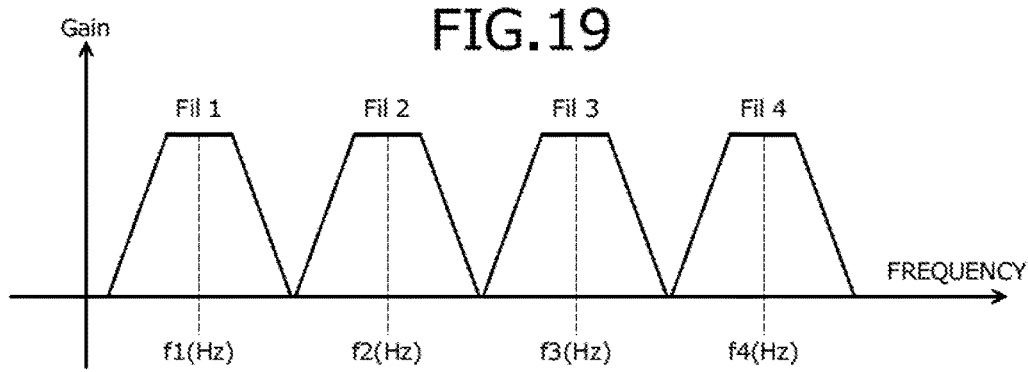
FIG. 19 is a diagram depicting filter frequency of the frequency analyzing unit according to the second embodiment.

FIG. 19 is a diagram depicting filter frequency of the frequency analyzing unit of the optical transmitter according to the second embodiment. The horizontal axis represents frequency and the vertical axis represents the level (gain). The filter 1801 (1801a to 1801d) is configured by frequency filters such as a bandpass filter, where the filter Fil1 extracts (transmits) frequency f1[Hz], the filter Fil2 extracts frequency f2[Hz], the filter Fil3 extracts frequency f3[Hz], and the filter Fil4 extracts frequency f4[Hz].

FIG. 20 is a diagram of detected signals transmitted by the filter of the frequency analyzing unit of the optical transmitter according to the second embodiment. From the detected signals transmitted by the paths (2 to 5), the DC component is removed, and the frequencies f1 to f4 of the dither signals of the LDs 1 to 4 (111) are extracted.

The detected signal of the PD 1 (112) is transmitted through the filter 1801a (Fil1) of the path (2), whereby frequency component of frequency f1[Hz] of the LD 1 (111) is taken out (the crosstalk components C are removed). The detected signal is transmitted through the filter 1801b (Fil2) on the path (3), whereby the frequency component (the crosstalk components C) of frequency f2[Hz] of the LD 2 (111) is taken out. Similarly, in the path (4), the frequency component (the crosstalk components C) of frequency f3[Hz] of the LD 3 (111) is taken out by the filter 1801c (Fil3). On the path (5), the frequency component (the crosstalk components C) of frequency f4[Hz] of the LD 4 (111) is taken out by the filter 1801d (Fil4).

The detected signals transmitted through the paths (1) to (5) of the frequency analyzing unit 102 are input to the control unit 103. The control unit 103 includes an ADC that AD converts the detected signals. Corresponding to the b paths (paths 1 to 5) per one PD (112), 5 ADCs are disposed and when there are 4 of the PDs 1 to 4 (111), a total of 20 ADC are disposed.

The control unit 103 performs a computation based on the input detected signals to obtain the ratio R of the crosstalk components C to the signal component S. The control unit 103 uses the computation results to monitor the optical power of the LDs 1 to 4 and to perform the APC via the LD-DRV unit 104.

An operation example of removing the crosstalk components C from the signal component S by the configuration of the second embodiment will be described. A setting process and a process of removing the crosstalk components by the control unit 103 will be described.

FIG. 21 is a flowchart of an example of the setting process by the optical transmitter according to the second embodiment. The control unit 103 sets the initial operation value of the LD-DRV unit 104.

The control unit 103 sets the respective bias current values Ib1 to Ib4 of the LDs 1 to 4 (111) (step S2101). The control unit 103 sets the dither signal Id(f) (step S2102). "f" is dither frequency [Hz], and "Id" is dither amplitude [mA]. Here, the frequency of the dither signal differs for each of the LDs 1 to 4 and, the dither signal for the LD 1 is set to frequency f1, the dither signal for the LD 2 is set to frequency f2, the dither signal for the LD 3 is set to frequency f3, and the dither signal for the LD 4 is set to frequency f4.

The control unit 103 controls the LD-DRV unit 104 based on the settings made at steps S2101 and S2102 (step S2103). Here, the bias points of the LDs 1 to 4 (111) waver by the frequencies f1 to f4 and the LDs 1 to 4 (111) are driven by the bias signal. The PDs 1 to 4 (112) receive optical power that wavers by the frequencies f1 to f4 (refer to FIG. 17).

FIG. 22 is a chart-depicting a setting example of the dither signal for each LD of the optical transmitter according to the second embodiment. The chart depicts the amplitude and frequency f of the dither signal to be output to the LDs 1 to 4 (111) by the control unit 103 via the LD-DRV unit 104 at step S2102 in the FIG. 21. For example, for the LD 1 (111), the frequency of the dither signal is assumed to be frequency f1, and the amplitude is assumed to be Id(f1).

FIG. 23 is a chart depicting an example of LD current values based on the setting process of the optical transmitter according to the second embodiment. The chart depicts an example of the current values of the LDs 1 to 4 (111), when the control unit 103 controls the LD-DRV unit 104 at step S2103 in FIG. 21. For example, the control unit 103 supplies current of Ib1+Id(f1) to the LD 1 (111).

FIG. 24 is a flowchart of an example of a process of removing crosstalk components of the optical transmitter according to the second embodiment. The control unit 103 executes the operations depicted in FIG. 24 after executing the selling process depicted in FIG. 21. An example of processing with respect to the PD 1 (112) will be described with reference to FIG. 24.

The control unit 103 calculates the root mean squares for the output signal of the PD 1 (112), transmitted through the paths (1) to (4) (step S2401). The control unit 103, with respect to the PD 1 (112), uses the calculated values obtained at step S2401 to compute the ratio R1 of the crosstalk components C to the signal component S (step S2402).

The control unit 103 uses the computed values obtained at steps S2401 and S2402 to compute the signal component S (actual monitored value) without the effects of the crosstalk components C (step S2403). The control unit 103 uses the signal component S (actual monitored value) obtained at step S2403 to monitor the transmission (TX) power of the LD 1 (111) and to execute the APC (step S2404).

In the process above, although an example of a process of computing the signal component S (actual monitored value) from which the effects of the crosstalk components C are removed is described with respect to the signal detected by the PD 1 (112), similar processing is performed for the other PDs 2 to 4. Thus, the signal component S (actual monitored value) from which the effects of the crosstalk components C are removed can be obtained by computation for the signals detected by the PDs 2 to 4 (111). The control unit 103 uses the signal component S (actual monitored value) to monitor the transmission (TX) power for the LDs 2 to 4 (111) and to execute the APC without being affected by crosstalk components.

FIG. 25 is a diagram of an example of information during the process of removing crosstalk components by the optical transmitter according to the second embodiment. The information corresponds to the contents of the memory unit 703, which stores values calculated (computed) by the control unit 103.

FIG. 25 depicts the root mean squares calculated at step S2401 in FIG. 24, for the output signal of the PD 1 (112), transmitted through the paths (1) to (5). The root mean square of the path (1) is stored to the memory unit 703 as PD1, the root mean square of the path (2) is stored as PD1_LD1, the root mean square of the path (3) is stored as PD1_LD2, the root mean square of the path (4) is stored as PD1_LD3, and the root mean square of the path (5) is stored as PD1_LD4.

At step S2402 in FIG. 24, the control unit 103 uses the values calculated for the paths (2) to (5) at step S2401, to obtain and store in the memory unit 703, the ratio R1 of the crosstalk components C to the signal component S of the PD 1 by the equation below.

$$R1=\{PD1\_LD2+PD1\_LD3\_PD1\_LD4\}/PD1\_LD1$$

At step S2403 in FIG. 24, the control unit 103 uses the calculated values obtained at steps S2401 and S2402, to obtain and store to the memory unit 703, the signal component S (actual monitored value) without the effects of the crosstalk components C.

At the frequency analyzing unit 102, the signal transmitted through the path (1) is the signal detected by the PD 1 (112), and includes the signal component S (back power of the LD 1) and the crosstalk components C (back power of the LDs 2 to 4).

The root mean square of the signal transmitted through the path (1) is PD1 and the ratio of the crosstalk components C to the signal component S is R1. Thus, the product PD1×R1 of PD1 and R1 is the crosstalk components C received by the PD 1 (112). Therefore, the control unit 103 calculates PD1(1−R1), which is the difference of PD1 less PD1×R1, and thereby obtains the actual monitored value (the signal component S).

When monitoring the optical output (TX) power via the PD 1 (112) and performing the APC with respect to the LD 1 (111), the control unit 103 uses the value of PD1×(1−R1). Thus, the control unit 103 monitors the optical output, power corresponding to a state not affected by crosstalk and performs the APC.

The ratios R2 to R4 of the crosstalk components C of the PDs 2 to 4 are similarly calculated, and the actual monitored values are obtained for the other PDs 2 to 4 by calculation based on the ratios R2 to R4. The monitoring of the optical output (TX) power using the PDs 2 to 4(112) and the APC of the LDs 2 to 4 (111) is performed without being affected by crosstalk.

As described, according to the second embodiment, similar to the first embodiment, a dither signal of a frequency that differs from that of the transmission signal is output to the LDs and crosstalk components are removed from the signal components detected by the respective PDs, whereby the optical output power is monitored without being affected by crosstalk and the APC is performed.

In the second embodiment, dither signals of frequencies f1 to f4 that differ according to LD are output; the PD output is branched; and crosstalk components are extracted via filters corresponding the frequencies. The ratio of the crosstalk components is obtained using the output signals of the paths, whereby the crosstalk components are removed from the signal component. Here, the root mean square of the output signals of the paths is calculated, whereby the extraction of the temporally varying crosstalk components of detected signals is facilitated.

In the second embodiment, dither signals of differing frequencies are output to the LDs, enabling crosstalk components of the LDs to be obtained simultaneously. Compared to the first embodiment, although dither signals of differing frequencies have to be generated of a number corresponding to the number of LDs and the number of filters and ADCs increases, the switch of frequency analyzing unit may be omitted.

In the second embodiment, dither signals of differing frequencies corresponding to the number of LDs are used and in the first embodiment, a dither signal of a single frequency is output separately to the LDs by time division. In either embodiment, the PD output is branched, the crosstalk components are extracted via filters corresponding to frequency, and the ratio of crosstalk components is obtained using the output signals of the paths, whereby the crosstalk components are removed from the signal component.

According to the described embodiments, a dither signal of a frequency that differs from that of a transmission signal is output to the LDs; at the PDs, the ratio of the crosstalk components received from the LDs is obtained; and computation to remove the crosstalk components from the signal component is performed. As a result, monitoring of the optical output power can be performed properly without being affected by crosstalk and the APC can be performed properly.

The crosstalk components received by the PDs are not a constant amount and change continuously consequent to changes in the temperature environment of LD operation. Nonetheless, the amount of crosstalk components can be obtained each time the computations above are performed and the crosstalk components can be removed from the signal component. As a result, even if the crosstalk components change accompanying temporal changes, the crosstalk components can be properly obtained and removed.

The dither signal used in the embodiments is the bias current that is supplied to the LD and that has been subject to amplitude modulation. The dither signal has a low frequency with respect to the frequency (25 Gbps) of the optical signal. Therefore, even during operation of the optical transmitter, the dither signal can be supplied to the LDs and computation to remove the crosstalk components can be performed.

The LD-DRV unit 104 includes, as separate chip components, a modulating unit configured to modulate the transmission signal by a high frequency and a driving unit configured to generate bias current, the modulating unit and the driving unit being operated in parallel. Thus, during operation as an optical transmitter to transmit the transmission signal as an optical signal, a control process of the first embodiment (FIGS. 8 and 10), or a control process of the second embodiment (FIGS. 21 and 24) can be performed in parallel. As a result, application to immediate power monitoring and the APC of an optical signal under transmission, based on the obtained crosstalk components, is enabled.

As described, according to the embodiments, even when plural LDs are arranged in a housing of a small optical transmitter such as a TOSA, crosstalk components from other LDs can be removed by electronic computation without disposal of a partition, opening, or lens. As a result, a high-speed TOSA, which includes the plural LDs, and an optical transmitter of a simple configuration can be made compact and at a low cost, and despite being compact, the TOSA and optical transmitter can monitor optical power and perform APC without being affected by crosstalk.

According to one aspect, optical output can be controlled eliminating the effects of optical crosstalk from adjacent laser diodes.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without, departing from the spirit and scope of the invention.

What is claimed is:

1. An optical transmitter in which a plurality of laser diodes that output optical signals from a forward end are disposed and for which optical power of the optical signals is controlled, the optical transmitter comprising:
   a plurality of light receiving devices that detect optical power of optical signals output from a back end of the plurality of laser diodes;
   an LD driving circuit that supplies to the plurality of laser diodes, a dither signal of a predetermined frequency at different timings, respectively, wherein the dither signal is bias current that has been amplitude modulated to the predetermined frequency that differs from that of a drive signal of the plurality of laser diodes;
   an analyzing circuit that includes:
      a switch that selects a target signal among signals output from the plurality of light receiving devices,
      a first path from which the target signal is output, and
      a second path on which a filter is disposed and from which an AC component of the target signal is output, wherein an DC component of the target signal is removed by the filter; and
   a control circuit that computes for the target signal and based on outputs from the second path at the different timings, a ratio of crosstalk components to a signal component received from a target laser diode among the plurality of laser diodes, and perform based on the ratio, a computation to remove the crosstalk components from the target signal.

2. An optical transmitter in which a plurality of laser diodes that output optical signals from a forward end are disposed and for which optical power of the optical signals is controlled, the optical transmitter comprising:
   a plurality of light receiving devices that detect optical power of optical signals output from a back end of the plurality of laser diodes;
   an LD driving circuit that supplies to the plurality of laser diodes, a plurality of dither signals of different frequencies, respectively, wherein each dither signal is bias current that has been amplitude modulated to a frequency that differs from that of a drive signal of the plurality of laser diodes;
   an analyzing circuit that includes:
      a first path from which a target signal selected from among signals output from the plurality of light receiving devices is output, and
      a plurality of second paths from which a plurality of frequency components of the target signal and having the different frequencies are respectively output; and
   a control circuit that computes for the target signal and based on outputs from the plurality of second paths, a ratio of crosstalk components to a signal component received from a target laser diode among the plurality of laser diodes, and perform based on the ratio, a computation to remove the crosstalk components from the target signal.

3. The optical transmitter according to claim 1, wherein the control circuit computes the ratio after computing a root mean square for each of outputs from the first path and the second path.

4. The optical transmitter according to claim 1, wherein the filter of the analyzing circuit is one of an analog filter and a digital filter.

5. The optical transmitter according to claim 1, wherein the plurality of laser diodes and the plurality of light receiving devices are disposed in a housing of an optical transmission subassembly.

6. The optical transmitter according to claim 1, further comprising an optical multiplexer that multiplexes and outputs to an optical transmission path, the optical signals output from the plurality of laser diodes.

7. A control method of an optical transmitter in which a plurality of laser diodes that output optical signals from a forward end are disposed and a plurality of light receiving devices detect optical power output from a back end of the plurality of laser diodes, and for which optical power of the optical signals is controlled based on a result of detection, the control method comprising:

supplying to the plurality of laser diodes by an LD driving circuit, a dither signal of a predetermined frequency at different timings, respectively, wherein the dither signal is bias current that has been amplitude modulated to the predetermined frequency that differs from that of a drive signal of the plurality of laser diodes;

selecting by a filter of an analyzing circuit, a target signal among signals output from the plurality of light receiving devices;

outputting the target signal from a first path of the analyzing circuit;

outputting an AC component of the target signal from a second path of the analyzing circuit, wherein an DC component of the target signal is removed by a filter disposed on the second path;

computing, by a control circuit and for the target signal and based on outputs from the second path at the different timings, a ratio of crosstalk components to a signal component received from a target laser diode among the plurality of laser diodes; and performing, by the control circuit and based on the ratio, a computation to remove the crosstalk components from the target signal.

8. The optical transmitter according to claim 2, wherein the control circuit computes the ratio after computing a root mean square for each of outputs from the first path and the second path.

9. The optical transmitter according to claim 2, wherein the filter of the analyzing circuit is one of an analog filter and a digital filter.

* * * * *